(12) United States Patent
Cusworth et al.

(10) Patent No.: US 11,242,135 B2
(45) Date of Patent: Feb. 8, 2022

(54) TAIL SKID SHOCK ABSORBER AND INDICATOR

(71) Applicant: The Boeing Company, Chicago, IL (US)

(72) Inventors: James E. Cusworth, Snohomish, WA (US); Michael P. Huested, Lake Stevens, WA (US); Justin D. Cottet, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 40 days.

(21) Appl. No.: 16/845,148

(22) Filed: Apr. 10, 2020

(65) Prior Publication Data

US 2020/0255129 A1    Aug. 13, 2020

Related U.S. Application Data

(63) Continuation of application No. 15/493,379, filed on Apr. 21, 2017, now Pat. No. 10,669,016.

(51) Int. Cl.
| | |
|---|---|
| *B64C 25/00* | (2006.01) |
| *B64C 25/58* | (2006.01) |
| *F16F 7/12* | (2006.01) |
| *B64C 25/34* | (2006.01) |
| *B64D 45/00* | (2006.01) |

(52) U.S. Cl.
CPC ............ *B64C 25/001* (2013.01); *B64C 25/34* (2013.01); *B64C 25/58* (2013.01); *B64D 45/00* (2013.01); *F16F 7/125* (2013.01); *B64C 2025/005* (2013.01); *B64D 2045/008* (2013.01); *B64D 2045/0085* (2013.01); *F16F 2230/0047* (2013.01); *F16F 2230/24* (2013.01); *F16F 2236/04* (2013.01)

(58) Field of Classification Search
CPC ....... B64C 25/001; B64C 25/34; B64C 25/52; B64C 25/64; B64C 25/28; B64C 25/58; B64C 2025/005; B64C 25/32; B64D 45/00; B64D 2045/008; B64D 2045/0085; F16F 7/125; F16F 2230/24; F16F 2230/0047; F16F 2236/04
See application file for complete search history.

(56) References Cited

U.S. PATENT DOCUMENTS

| | | | |
|---|---|---|---|
| 1,613,843 | A | 1/1927 | Mummert et al. |
| 1,937,511 | A | 12/1933 | Crane |
| 2,350,103 | A | 5/1944 | Fanger |

(Continued)

FOREIGN PATENT DOCUMENTS

| | | |
|---|---|---|
| EP | 0319051 | 6/1989 |
| EP | 2687416 | 1/2014 |

(Continued)

OTHER PUBLICATIONS

European Search Report, European Application No. 18168027 dated Jun. 26, 2018.

*Primary Examiner* — Valentina Xavier
(74) *Attorney, Agent, or Firm* — Perman & Green, LLP

(57) ABSTRACT

A tail skid shock absorber including an outer shock absorber canister, a crushable indicator cartridge disposed within the outer shock absorber canister, and an indicator rod coupled to the crushable indicator cartridge so as to move with a portion of the crushable indicator cartridge as a unit.

20 Claims, 14 Drawing Sheets

(56) References Cited

U.S. PATENT DOCUMENTS

| | | | |
|---|---|---|---|
| 4,815,678 | A | 3/1989 | Gawne |
| 5,201,478 | A | 4/1993 | Wooley |
| 5,927,646 | A * | 7/1999 | Sandy .................... B64C 25/52 |
| | | | 244/108 |
| 2003/0057318 | A1 | 3/2003 | Struzik et al. |
| 2008/0111386 | A1 | 5/2008 | Boraas |
| 2011/0214601 | A1 | 9/2011 | Martin et al. |
| 2017/0057625 | A1 | 3/2017 | Mellor |

FOREIGN PATENT DOCUMENTS

| | | |
|---|---|---|
| EP | 3135582 | 3/2017 |
| JP | H11512366 | 10/1999 |
| JP | 2012502294 | 1/2012 |
| WO | 9710145 | 3/1997 |
| WO | WO2010029224 | 3/2010 |

\* cited by examiner

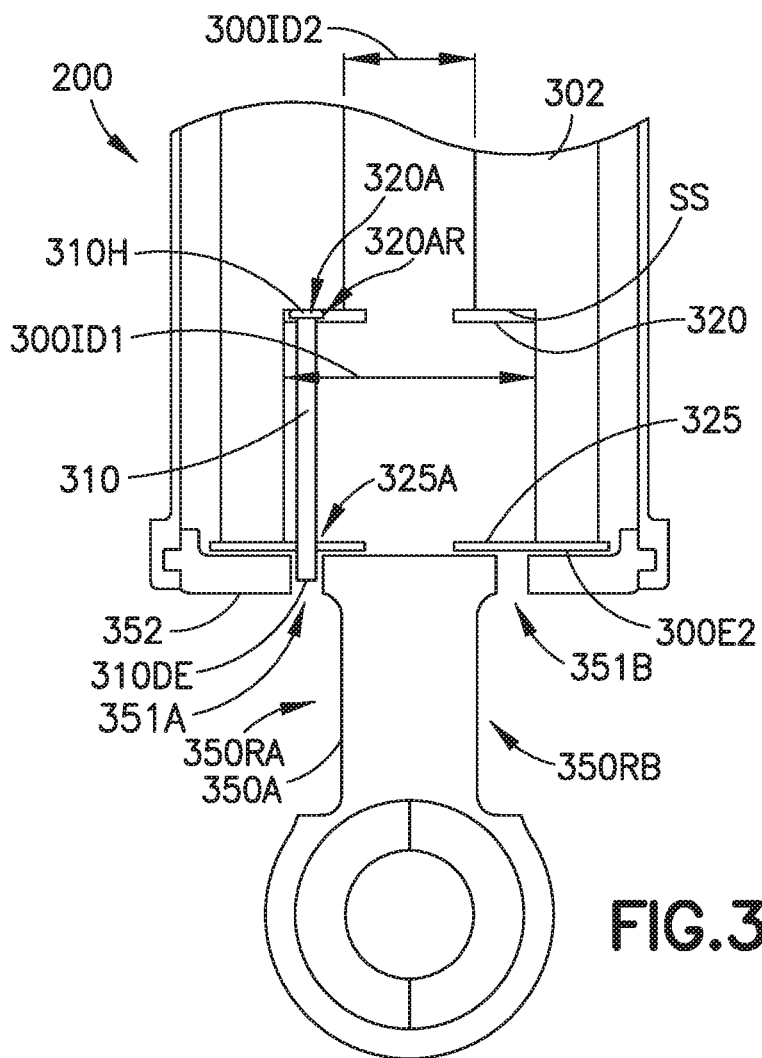
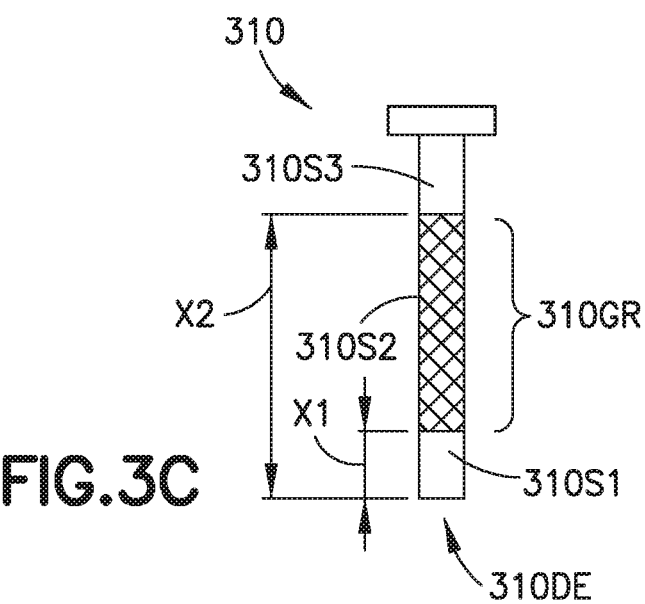

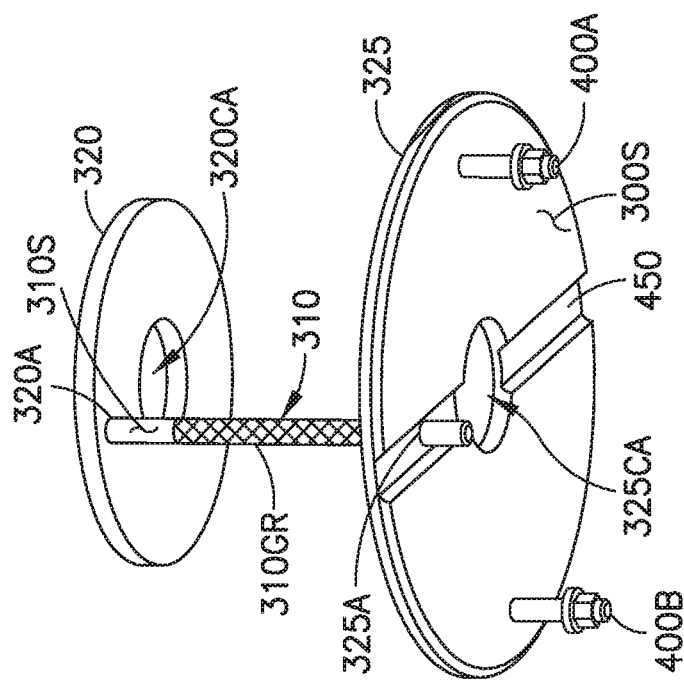
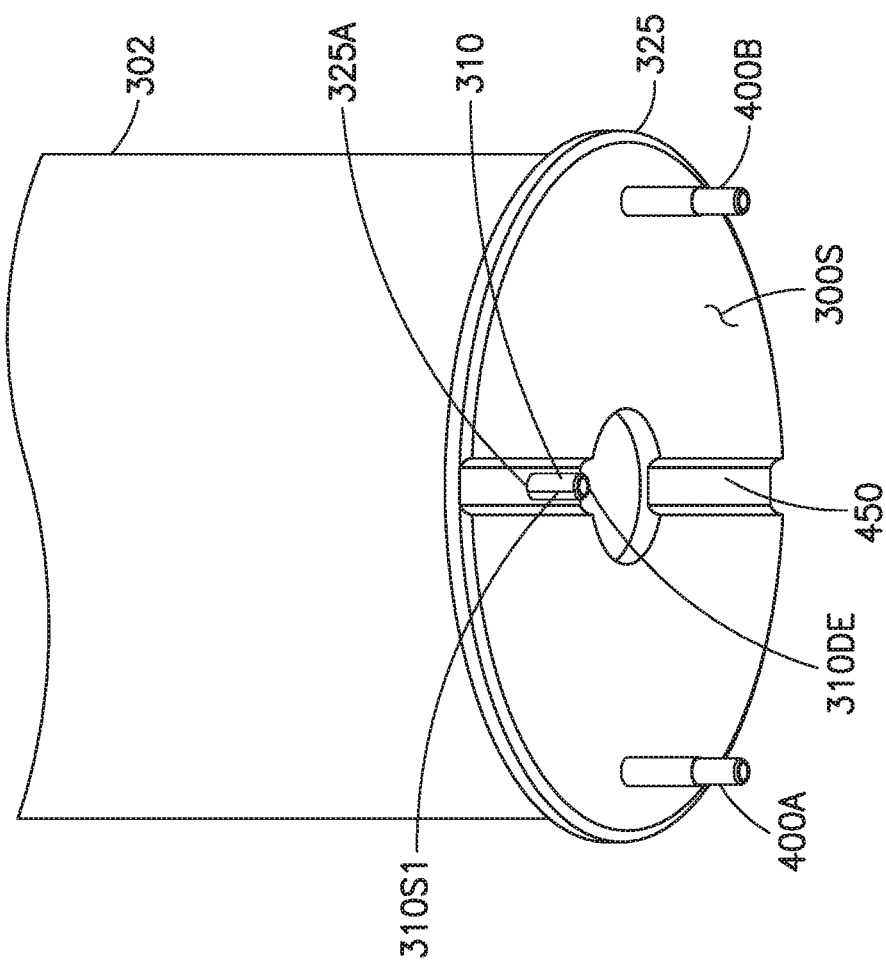

TAIL SKID SHOCK ABSORBER AND INDICATOR

CROSS-REFERENCE TO RELATED APPLICATIONS

This application is a continuation of and claims the benefit of U.S. Non-Provisional patent application Ser. No. 15/493,379 filed on Apr. 21, 2017 (now U.S. Pat. No. 10,669,016 issued on Jun. 2, 2020), the disclosure of which is incorporated by reference herein in its entirety.

BACKGROUND

1. Field

The aspects of the present disclosure generally relate to aircraft tail skids and aircraft incorporating those tail skids and, in particular, to tail skids having energy absorption indicators that provide a useful life remaining (e.g., serviceability) for an energy absorption unit of the tail skid.

2. Brief Description of Related Developments

An aircraft generally includes a tail skid that protects the aft portion or tail of the aircraft upon, for example, take off and or landing of the aircraft. For example, in some instances the tail skid will contact (e.g., a tail strike event) the runway, or other surface on which the aircraft is landing on or taking off from. In one aspect, the tail skid includes energy absorption capabilities that absorb the contact energy between the tail skid and, e.g., the runway. The energy absorption capabilities of the tail skid have a useful life, as the energy absorption capabilities generally include a consumable crushable cartridge that is disposed within a tail skid shock absorber.

Currently, tail skids include indicator rods that provide information regarding tail strike events. Generally, this tail strike event information is provided by a series of two indicator rods disposed on the tail skid shock absorber. These indicator rods are located within a housing of a crush indicator system assembly that is separate from the crushable cartridge of the tail skid, where the indicator rods are held in a retracted position within the separate housing by shear pins. The indicator rods have differing lengths so that, as the crushable cartridge is crushed, a portion of an exterior canister of the tail skid shock absorber pushes on at least one of the indicator rods due to, for example, relative motion between portions of the exterior canister. Pushing on the at least one indicator rod shears the shear pin and causes the indicator rod to fall freely within the separate housing of the crush indicator system, so that a portion of the indicator rod is exposed outside of the tail skid shock absorber to visually indicate that the energy absorption capability of the crush cartridge as partially or entirely exhausted. Currently, after being crushed, the tail skid shock absorber extends and returns to its previous length to properly stow during flight. This objective requires the indication to be decoupled from the outer housing. For example, if the tail strike event is of at least a first magnitude, a first indicator rod freely falls to a fully deployed position so as to be visually exposed to provide a visual indicator that the crushable cartridge still has about full energy absorption available; while if the tail strike event is of at least a second magnitude (which is greater than the first magnitude), a second indicator rod freely falls to a fully deployed position to be visually exposed along with the first indicator rod to provide a visual indicator that the crushable cartridge has less than full energy absorption available. As described above, with conventional tail skid energy absorption indication systems, the amount of energy absorption available in the crushable cartridge is indicated in a very coarse manner (e.g., about full capability and less than full capability).

Further, the indicator rods of the conventional tail skid energy absorption indication systems are subject to being dislodged from the tail skid shock absorber. For example, as the indicator rods are allowed to freely fall so as to protrude from the tail skid shock absorber, the indicator rods are free to move relative to the tail skid shock absorber. These indicator rods are only held in place by a small head on the respective indicator rod. However, movement of the indicator rods may cause a hole to open up or expand in the indicator assembly through which the indicator rods extend, thereby allowing the indicator rod to fall entirely through the hole and onto the ground. Further, the indicator rods are exposed such that tail skid components may cause bending of the indicator rods. The bending of the rods may also cause the indicator rods to be removed or dislodged from the indicator assembly. The purpose of the crush indicator system is to provide an indication of useful life of the tail skid shock absorber after an event that does not exceed the second magnitude. However, once exposed or triggered, the indicator rod is exposed for many additional flights and is subject to being damaged (e.g., falling to the ground or being bent).

As can be seen above, because the indicator rods of the conventional crush indicator system are a separate unit from the canister, the indicator rods, or some other portion of the indicator system, may be dislodged and result in debris on the runway (or some other place on the ground). Further, conventional indicator rods are only triggered based on exceeding a first or second threshold, so as to shear the shear pins holding the first and second indicator rods in place within the separate housing, where the indicator rods are fully deployed without any intermediate position. Thus, the conventional crush indicator system does not provide any indication of the magnitude of the tail strike event other than exceeding one or both thresholds.

SUMMARY

The following is a non-exhaustive list of examples, which may or may not be claimed, of the subject matter according to the present disclosure.

One example of the subject matter according to the present disclosure relates to a tail skid shock absorber comprising an outer shock absorber canister; a crushable indicator cartridge disposed within the outer shock absorber canister; and, an indicator rod coupled to the crushable indicator cartridge, so as to move with a portion of the crushable indicator cartridge as a unit.

Another example of the subject matter according to the present disclosure relates to a crushable indicator cartridge for a tail skid shock absorber, the crushable indicator cartridge comprising an indicator rod; an elongated member defining a crush core; a first plate coupled to the crush core, the indicator rod being coupled to the first plate; and, a second plate coupled to the crush core, the second plate defining an outer surface of the crushable indicator cartridge and including a second plate aperture through which the indicator rod extends.

Still another example of the subject matter according to the present disclosure relates to an aircraft comprising an airframe; and a tail skid shock absorber coupled to the airframe, the tail skid shock absorber including an outer shock absorber canister; a crushable indicator cartridge disposed within the outer shock absorber canister; and, an indicator rod coupled to the crushable indicator cartridge so as to move with a portion of the crushable indicator cartridge as a unit.

Yet another example of the subject matter according to the present disclosure relates to a method for indicating an amount of energy absorption remaining in a tail skid shock absorber, the method comprising inserting a crushable indicator cartridge into an outer shock absorber canister, where the crushable indicator includes an indicator rod coupled to the crushable indicator cartridge, so as to move with a portion of the crushable indicator cartridge as a unit; and, crushing the crushable indicator cartridge through contact of the airplane tail skid with an object, so that the indicator rod extends and is exposed from the outer shock absorber canister.

BRIEF DESCRIPTION OF THE DRAWINGS

Figure 1:
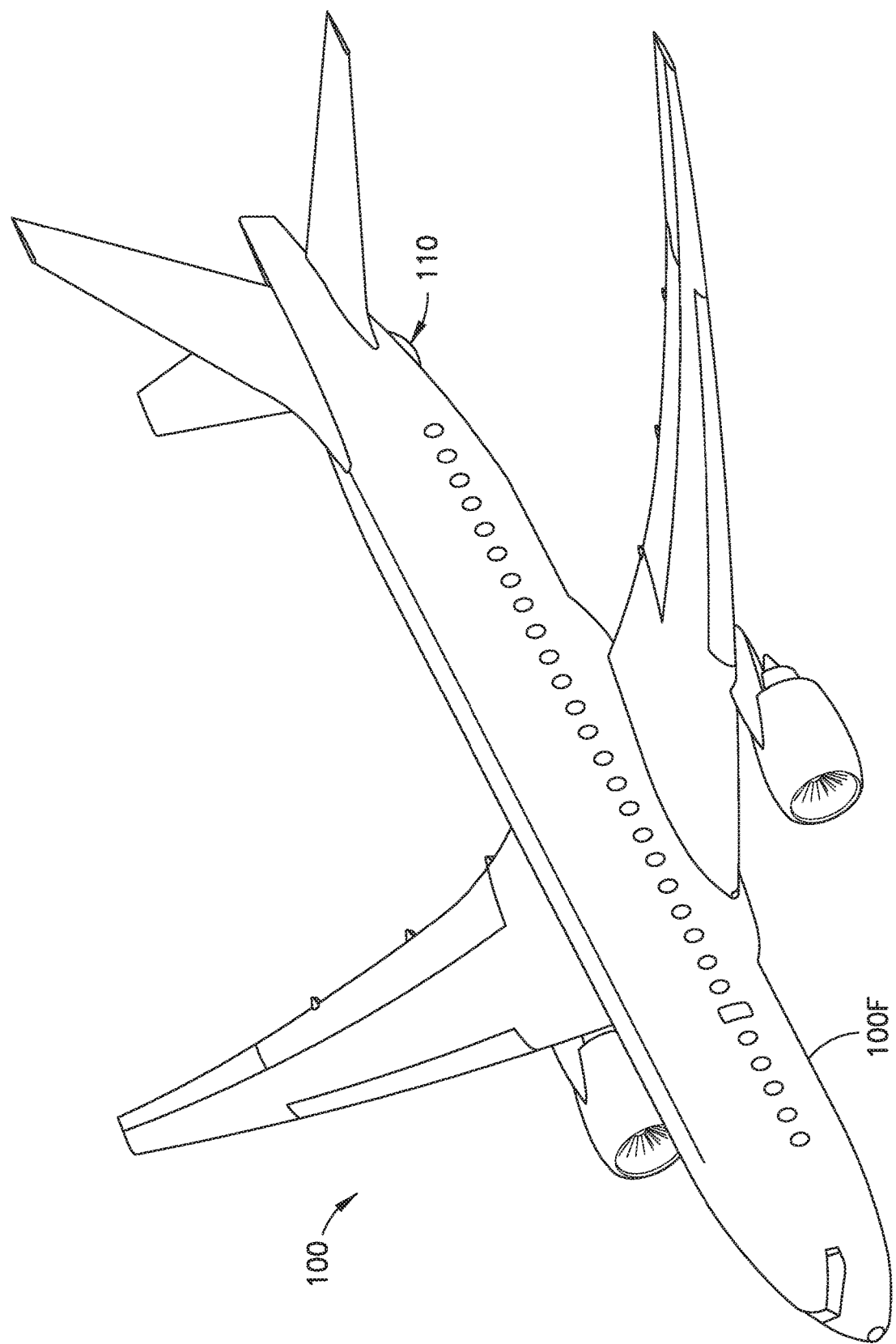
Figure 2:
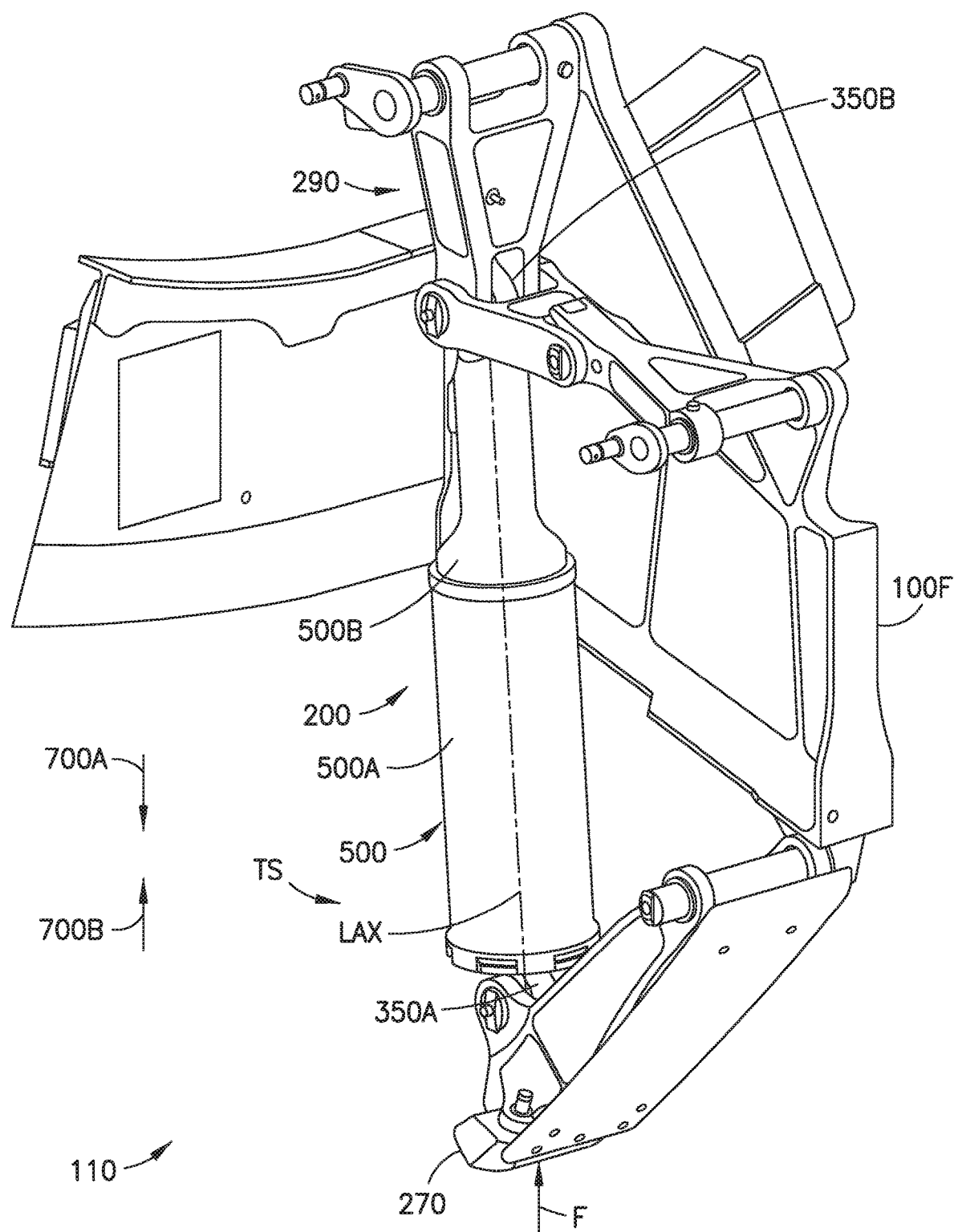
Figure 3A:
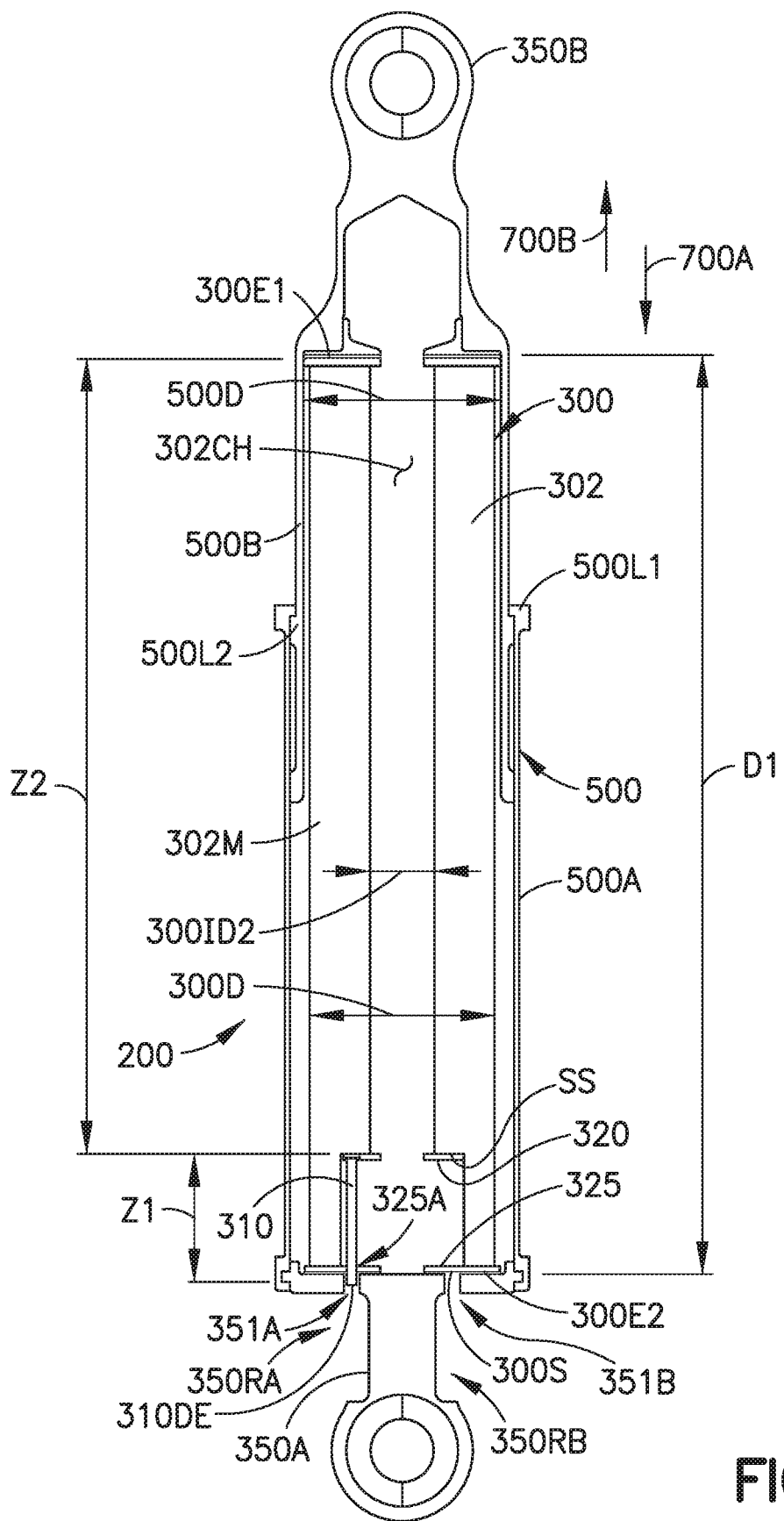
Figure 5A:
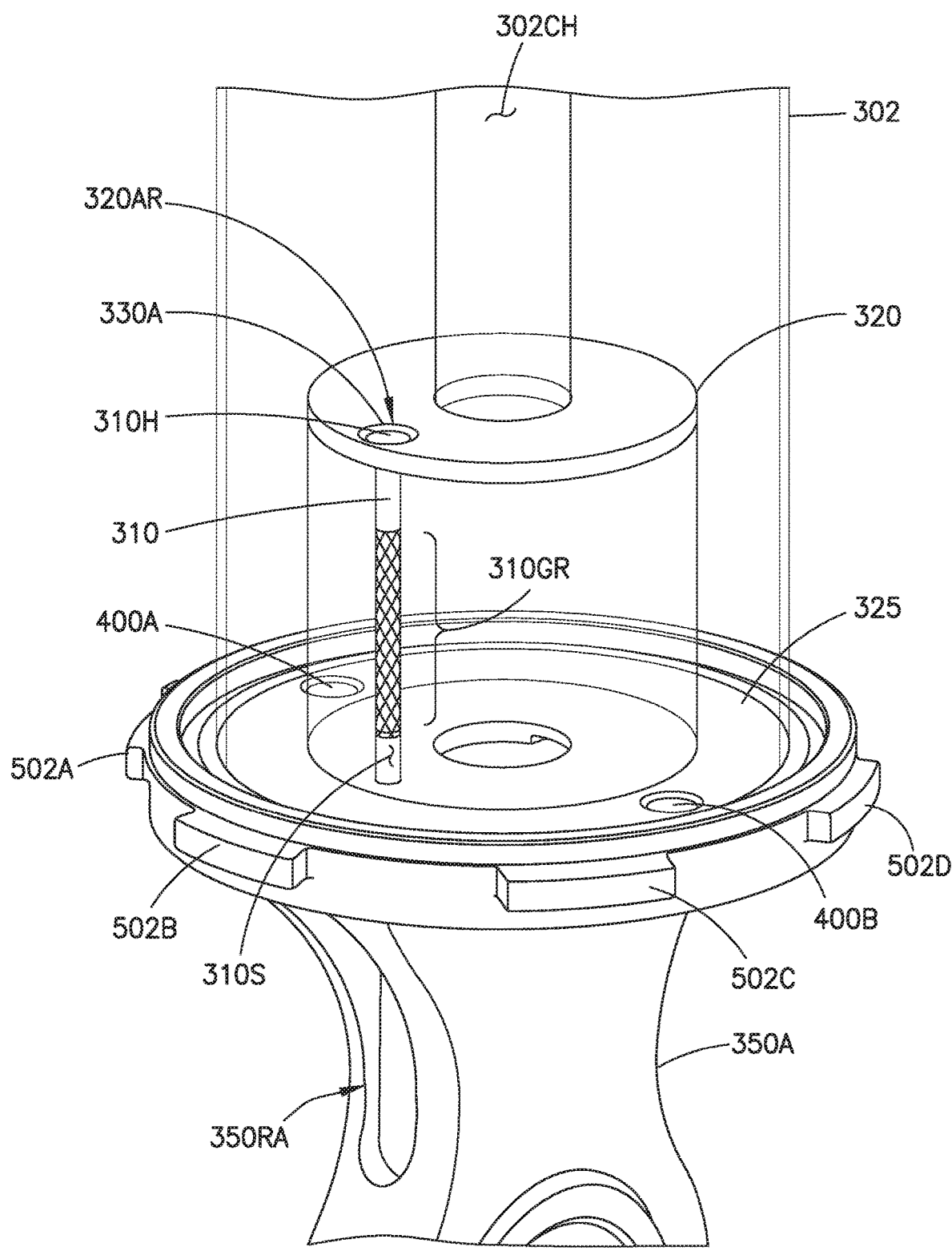
Figure 5B:
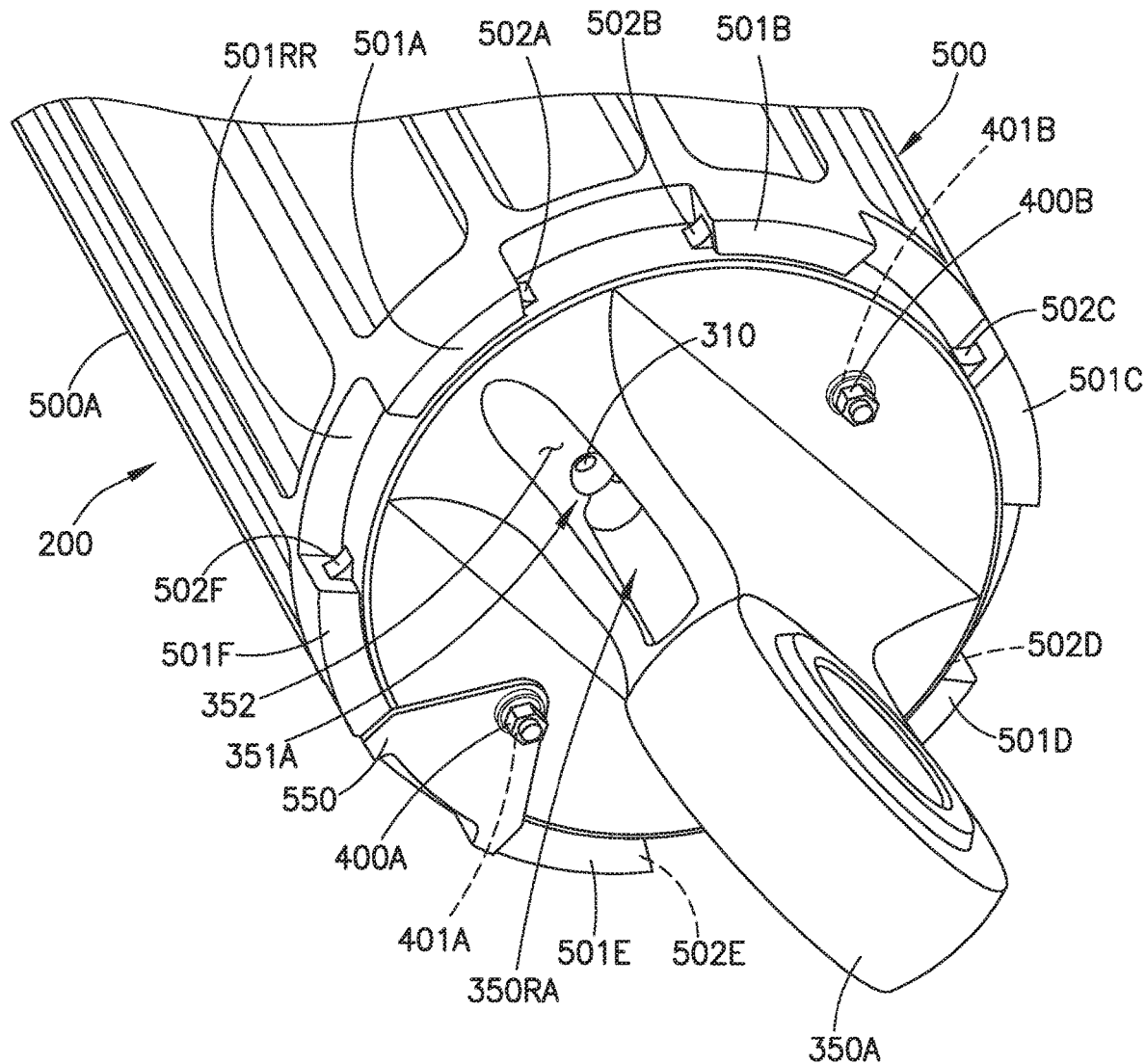
Figure 6A:
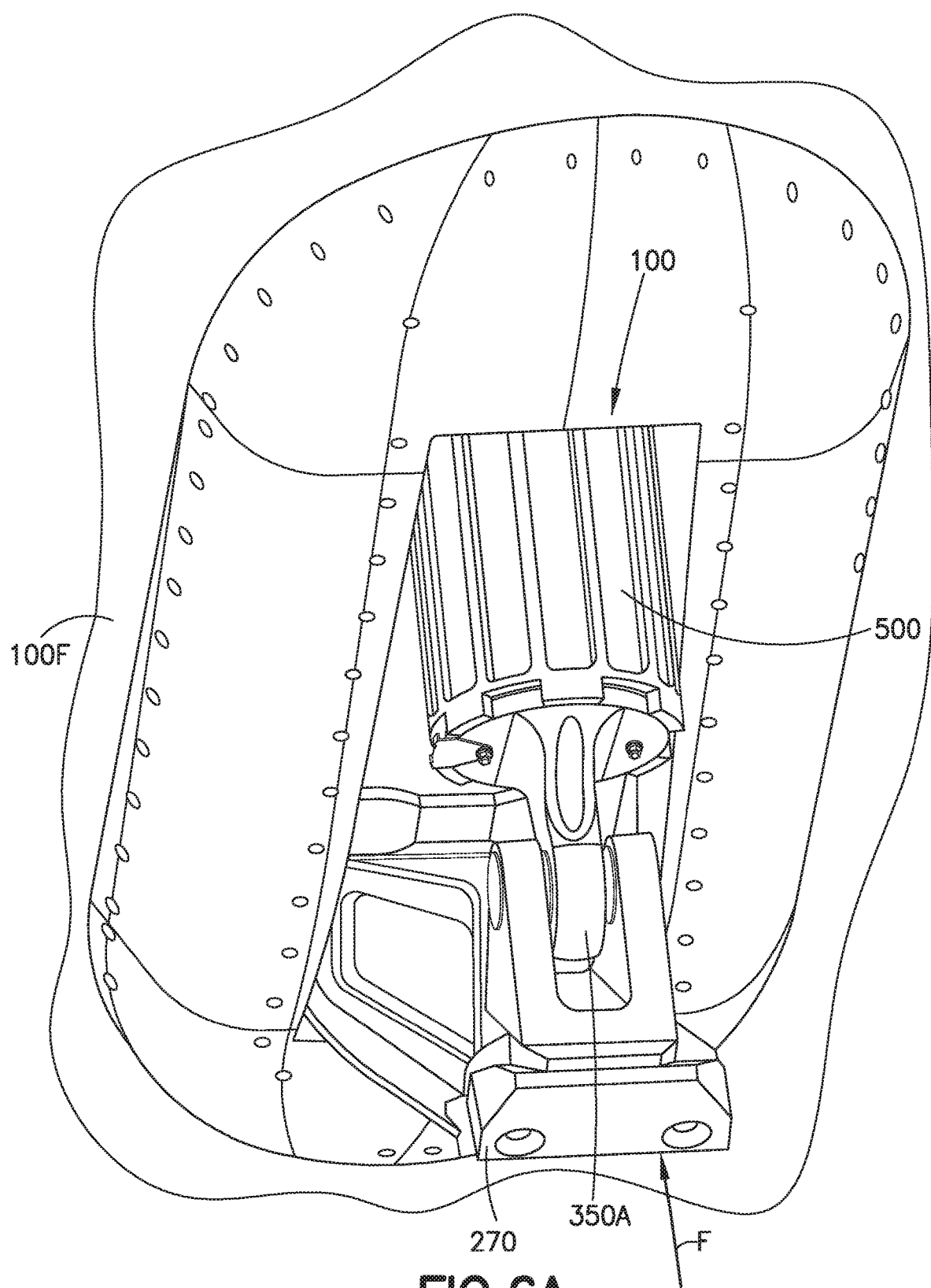
Figure 6B:
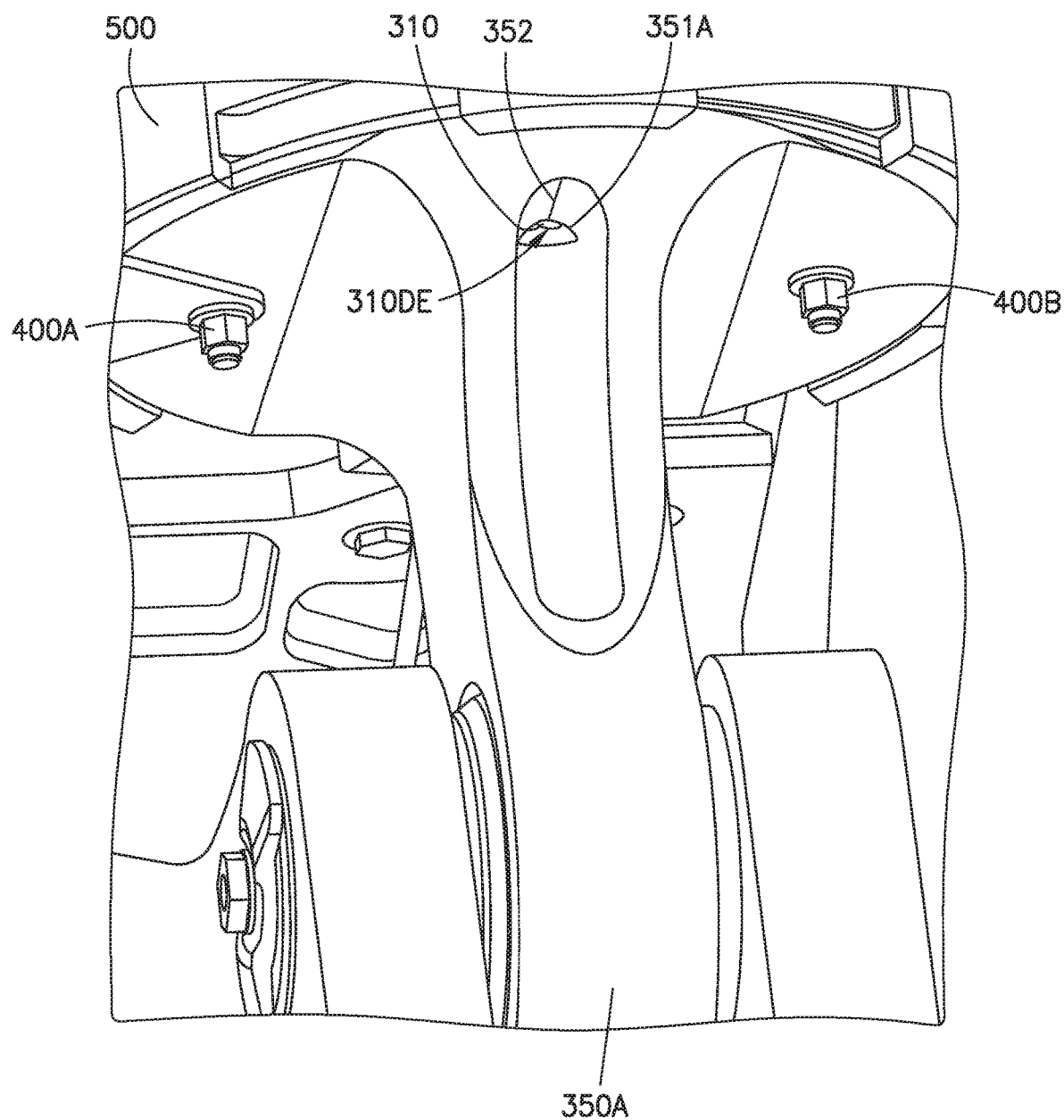
Figure 6C:
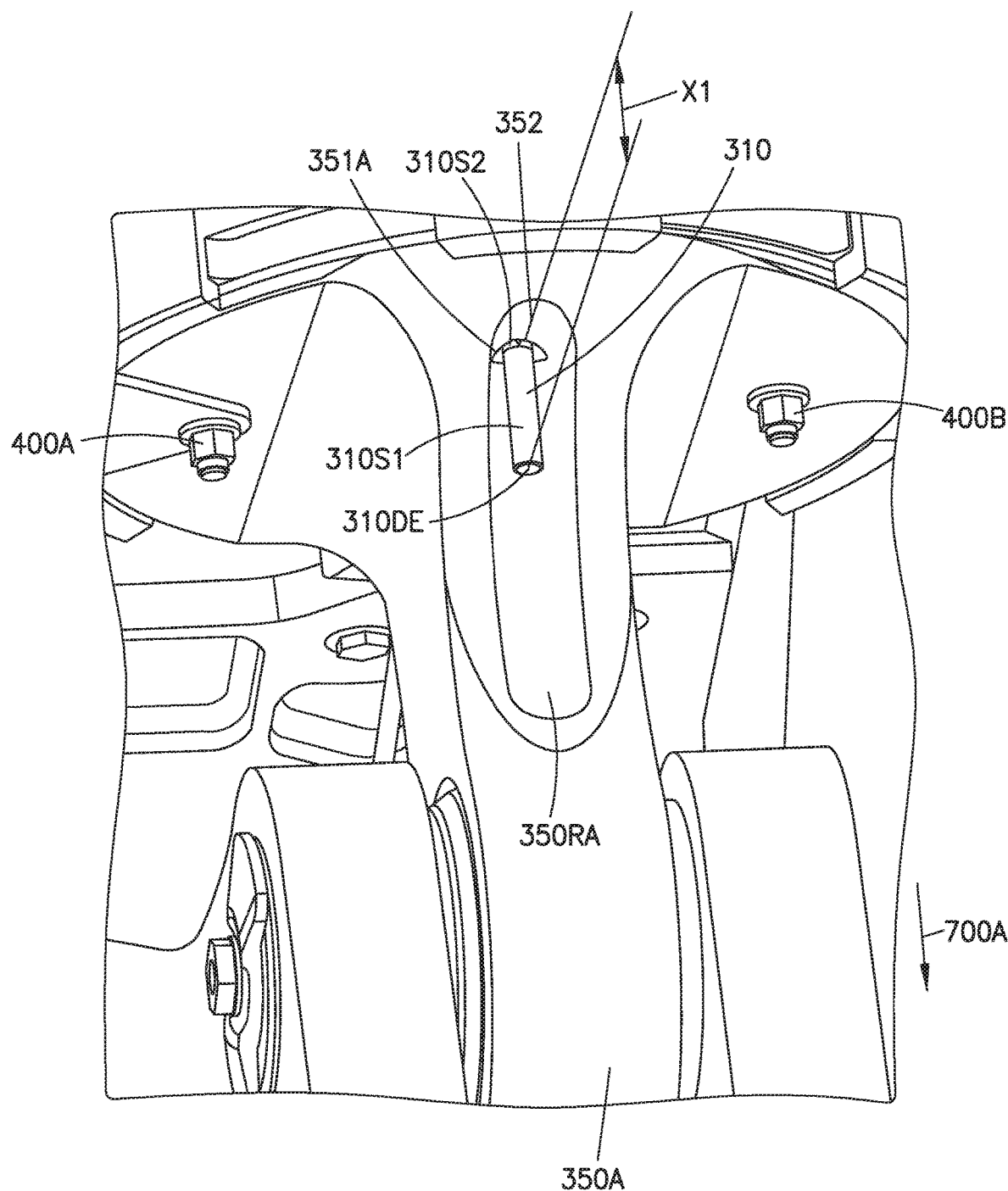
Figure 6D:
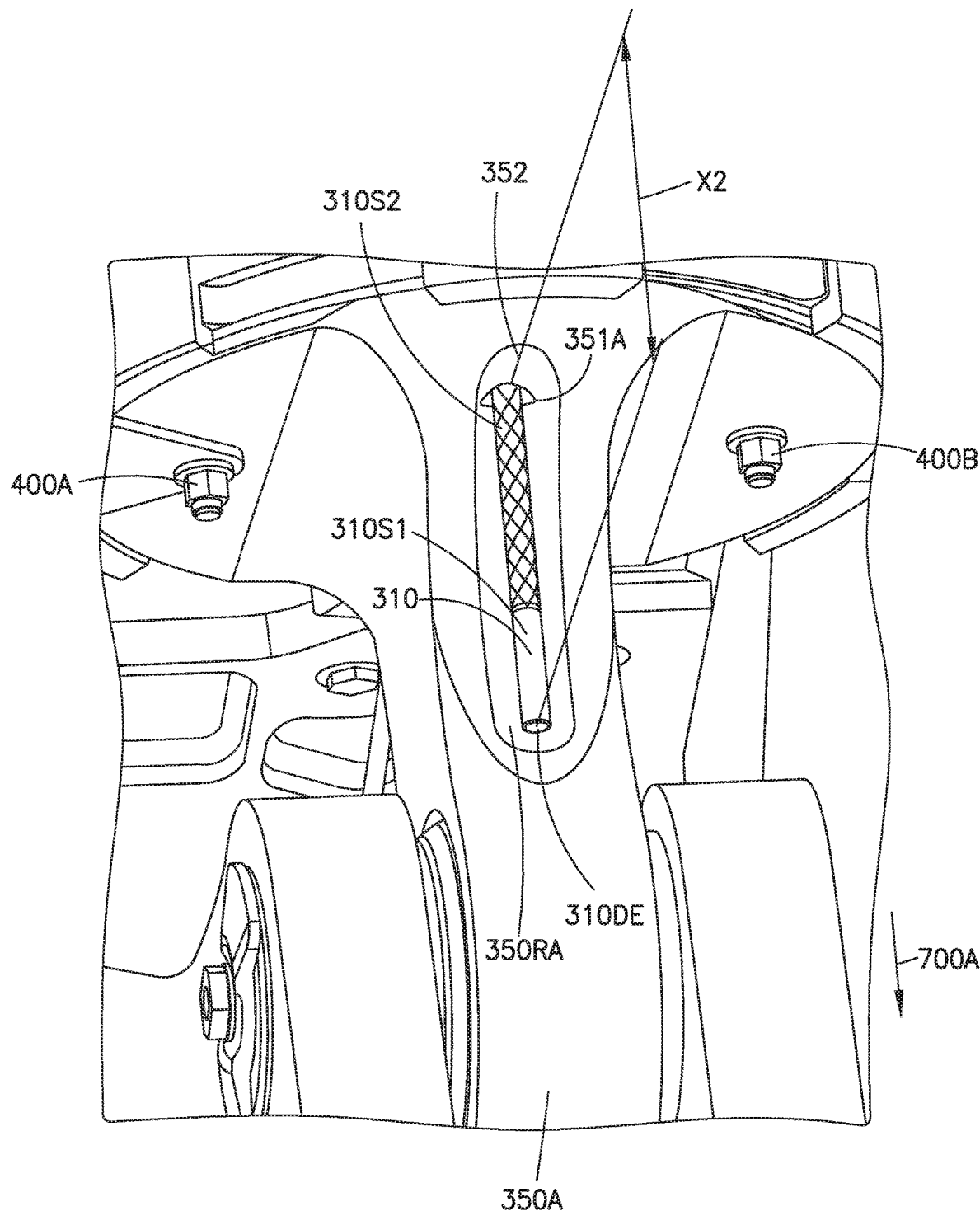
Figure 7A:
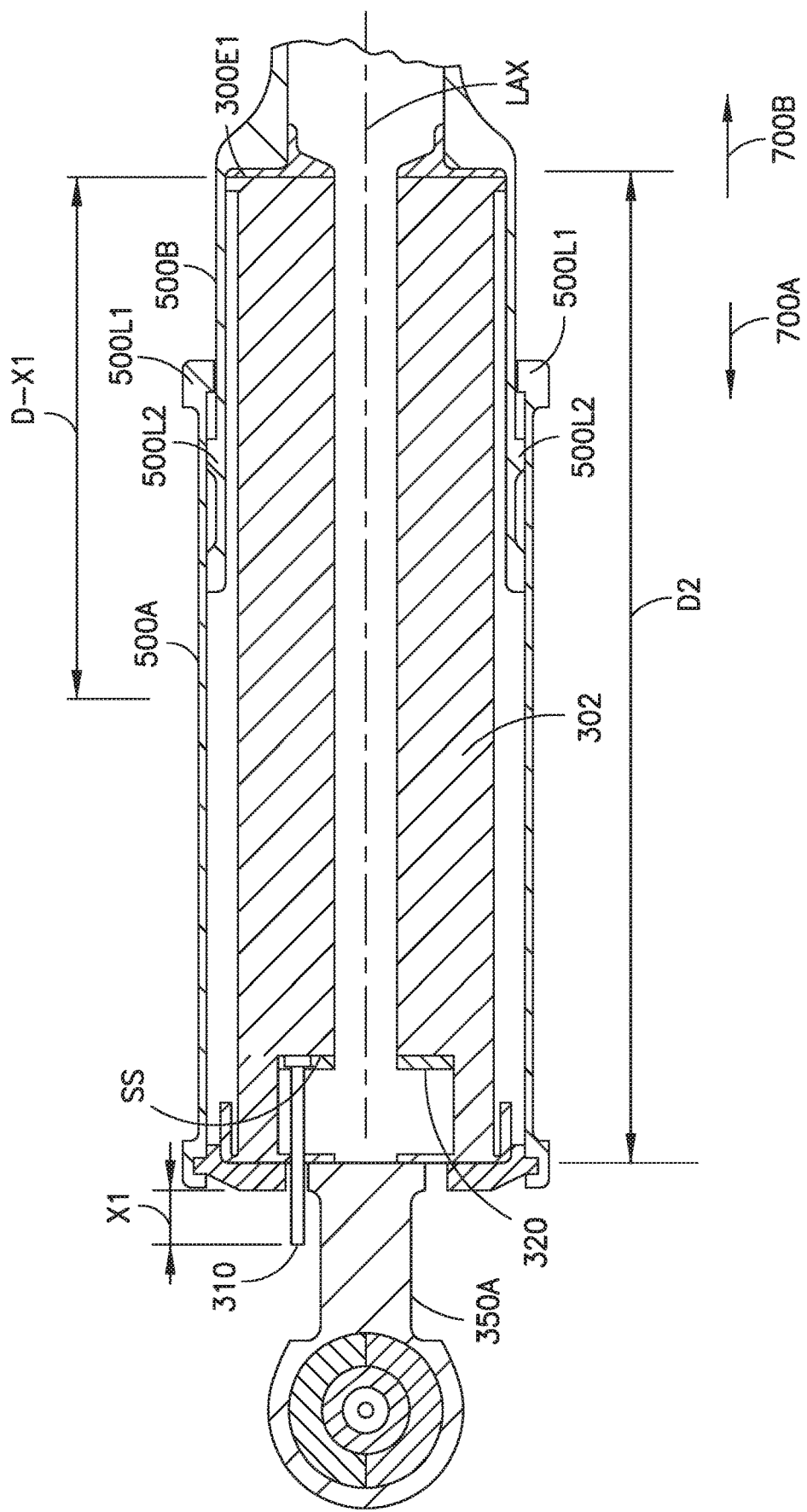
Figure 7B:
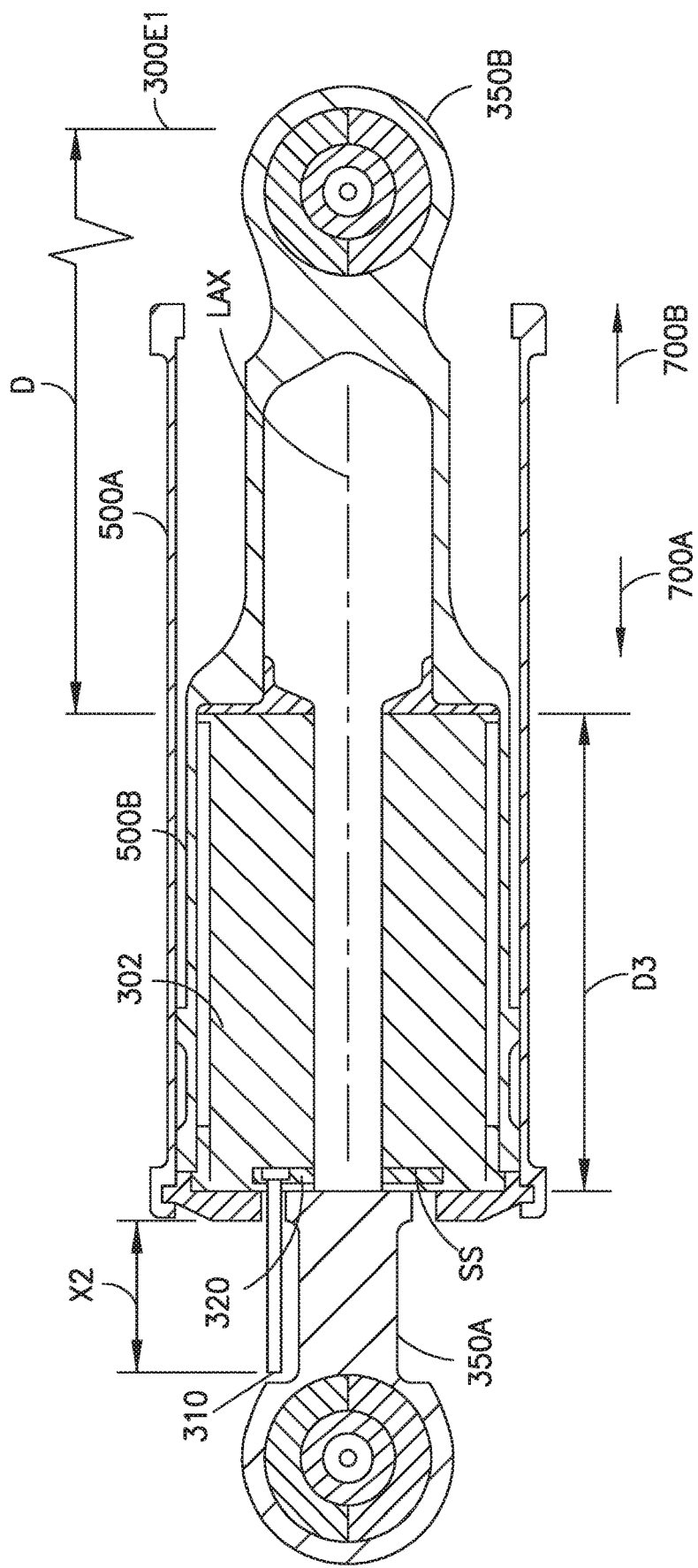
Figure 8:
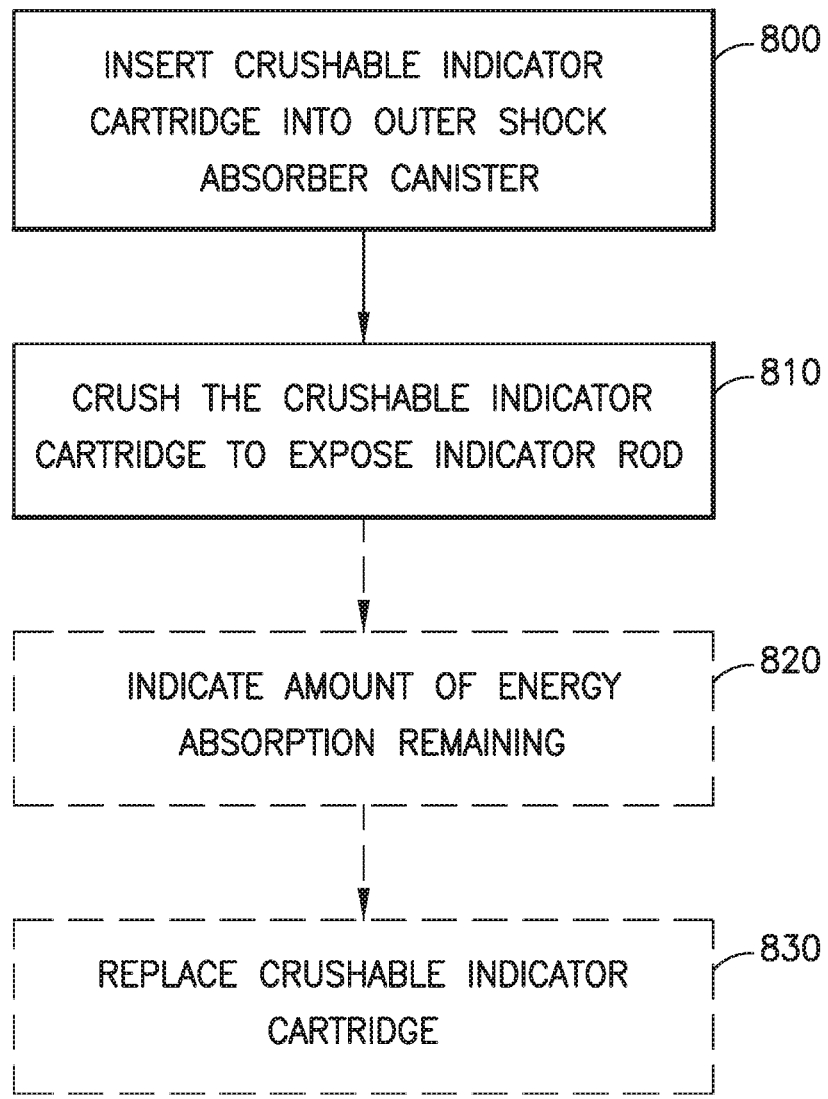

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of an exemplary aircraft in accordance with aspects of the present disclosure;

FIG. 2 is a schematic illustration of a tail skid in accordance with aspects of the present disclosure;

FIG. 3A is a schematic cross-sectional illustration of a tail skid shock absorber in accordance with aspects of the present disclosure;

FIG. 3B is a schematic cross-sectional illustration of a portion of the tail skid shock absorber of FIG. 3A in accordance with aspects of the present disclosure;

FIG. 3C is a schematic illustration of a portion of the tail skid shock absorber of FIG. 3A in accordance with aspects of the present disclosure;

FIG. 4A is a schematic illustration of a portion of a crushable indicator cartridge of the tails skid shock absorber of FIG. 3A in accordance with aspects of the present disclosure;

FIG. 4B is a schematic illustration of a portion of the crushable indicator cartridge of FIG. 4A in accordance with aspects of the present disclosure;

FIG. 5A is a schematic illustration of a portion of the tail skid shock absorber of FIG. 3A in accordance with aspects of the present disclosure;

FIG. 5B is a schematic illustration of a portion of the tail skid shock absorber of FIG. 3A in accordance with aspects of the present disclosure;

FIG. 6A is a schematic illustration of a portion of the aircraft of FIG. 1 including the tail skid of FIG. 2 in accordance with aspects of the present disclosure;

FIG. 6B is a schematic illustration of a portion of the tail skid of FIG. 2 including the tail skid shock absorber of FIG. 3A in accordance with aspects of the present disclosure;

FIG. 6C is a schematic illustration of a portion of the tail skid of FIG. 2 including the tail skid shock absorber of FIG. 3A in accordance with aspects of the present disclosure;

FIG. 6D is a schematic illustration of a portion of the tail skid of FIG. 2 including the tail skid shock absorber of FIG. 3A in accordance with aspects of the present disclosure;

FIG. 7A is a schematic cross-sectional illustration of the tail skid shock absorber of FIG. 3A in accordance with aspects of the present disclosure;

FIG. 7B is a schematic cross-sectional illustration of the tail skid shock absorber of FIG. 3A in accordance with aspects of the present disclosure; and FIG. 8 is a flow diagram of a method in accordance with aspects of the present disclosure.

DETAILED DESCRIPTION

Referring to FIGS. 1, 2, 3A and 3B, the aspects of the present disclosure described herein provide a tail skid shock absorber 110 that includes a single indicator rod 310 that is integral with the tail skid shock absorber 110. For example, the indicator rod 310 is retained by a crushable indicator cartridge 300, which defines a crush core 302, located within an outer shock absorber canister 200 of the tail skid shock absorber 110. As the crushable indicator cartridge 300 is crushed, the indicator rod 310 moves a unit with a portion of the crushable indicator cartridge 300, so that a portion of the indicator rod 310 extends outside of the outer shock absorber canister 200. Extension of the indicator rod 310 outside of the outer shock absorber canister 200 provides a visual indicator of an amount of energy absorption remaining in the crushable indicator cartridge 300. The aspects of the present disclosure described herein provide for a reduced number of parts to be ordered when the crushable indicator cartridge 300 is replaced. This reduced number of parts is due to, for example, the integration of the indicator rod 310 with the crush core 302 that is defined by the crushable indicator cartridge 300. Accordingly, the aspects of the present disclosure eliminate the separate crush indicator systems described above in the background section. In addition, in aspects of the present disclosure, the indicator rod 310 is held captive or retained by the crush core 302 of the crushable indicator cartridge 300. Retention of the indictor rod 310 by the crush core 302 substantially prevents the indicator rod 310 from being dislodged from the tail skid shock absorber 110 when the indicator rod 310 is exposed from the outer shock absorber canister 200 for visual inspection. The retention of the indicator rod 310 by the crush core 302 may also provide an indication of the magnitude of a tail strike event because the amount of force required to crush the crush core 302 a predetermined distance may be known and can be determined by, for example, measuring an amount of the indicator rod 310 that is exposed for visual inspection. In one aspect, the indicator rod 310 includes suitable graduations 310GR (see FIGS. 3C and 4B) configured to provide a measurement scale with respect to an amount of exposure of the indicator rod 310. The aspects of the present disclosure also provide a recessed area 350RA, 350RB in which the indicator rod 310 extends for visual inspection to shield the indicator rod 310 from contact with other objects.

Illustrative, non-exhaustive examples, which may or may not be claimed, of the subject matter according to the present disclosure are provided below.

Still referring to FIGS. 1, 2, 3A and 3B as well as FIGS. 5A and 5B, the tail skid shock absorber 110 includes an outer shock absorber canister 200. The outer shock absorber canister 200 includes an elongated tube 500 and at least one end fitting 350A where the end fitting is configured to couple with one of a tail skid shoe 270 and an airframe 100F of the aircraft 100. For example, the elongated tube 500 includes a first tube portion 500A and a second tube portion 500B that are movable relative to each other along a longitudinal axis LAX of the elongated tube 500 (e.g., the shock absorber canister 200). In one aspect, the second tube portion 500B may be slidable within the first tube portion 500A. The first tube portion 500A and the second tube portion 500B include any suitable locking features 500L1, 500L2 to prevent over-extension of the first tube portion 500A and the second tube portion 500B in direction 700B which may cause separation of the first tube portion 500A from the second tube portion 500B.

The first tube portion 500A and the second tube portion 500B form an exterior of the shock absorber canister 200. In one aspect, the second tube portion 500B is integrally formed with an end fitting 350B; while the end fitting 350A is removably coupled to the first tube portion 500A of the elongated tube 500 in any suitable manner. For example, the first tube portion 500A includes a plurality of lugs 501A-501F and the end fitting 350A includes a plurality of mating lugs 502A-502F. The lugs 501A-501F and the mating lugs 502A-502F are radially spaced about the longitudinal axis LAX so that the mating lugs 502A, 502F are coupled and decoupled with the lugs 501A-501F through rotation of the end fitting 350A relative to the first tube portion 500A. In one aspect, any suitable anti-rotation device 550 is provided to prevent rotation and disassembly/decoupling of the end fitting 350A and the first tube portion 500A as will be described in greater detail herein. In other aspects, the end fitting 350A may be coupled to first tube portion in any suitable manner such as by a threaded coupling, a pinned coupling, a clipped coupling, etc.

In the aspect illustrated in FIG. 2, the end fitting 350A is illustrated as being coupled to the tail skid shoe 270. The end fitting 350B is illustrated as being coupled to the airframe 110F through, e.g., tail skid linkage 290. In other aspects the end fitting 350A may be coupled to the airframe 110F while the end fitting 350B is coupled to the tail skid shoe 270.

Referring now to FIGS. 3A, 3B, 4A and 4B, the tail skid shock absorber 110 also includes a crushable indicator cartridge 300 disposed within the outer shock absorber canister 200. An outer diameter 300D of the crushable indicator cartridge 300 is smaller than an inner diameter 500D of the outer shock absorber canister 200 to allow insertion and removal of the crushable indicator cartridge 300 to and from the outer shock absorber canister 200. The crushable indicator cartridge 300 includes a first end 300E1 and a second end 300E2. The crushable indicator cartridge 300 may be constructed of any suitable material, such as any suitable corrugated metal and/or composite materials, where the crushable indicator cartridge has predetermined crush characteristics, e.g., to begin compaction/crushing at a predetermined load. The compression strength of the crushable indicator cartridge 300 is known throughout a predetermined crushable distance D (see FIG. 7B) of the crushable indicator cartridge 300. The crushable indicator cartridge 300 has an uncompressed length D1 and forms an elongated member 302M that defines a crush core 302. In one aspect, the crush core 302 includes a first portion Z1 at, for example, the second end 300E2, that has a reduced crushed capability compared to a second portion Z2 of the crush core 302. For example, the crush core 302 may include a channel 302CH extending through the crush core 302 between the first end 300E1 and the second end 300E2, where the channel 302CH has a first diameter 300ID1 within the first portion Z1 and a second diameter 300ID2 through a second portion Z2 (FIG. 3A) of the crush core 302. As can be seen in FIG. 3B, the change from the first diameter 300ID1 to the second diameter 300ID2 forms a step or seating surface SS.

In one aspect, the crush core 302 includes a first plate 320, a second plate 325 and a single indicator rod 310. The first plate 320, the second plate 325 and the single indicator rod 310 are coupled to the crush core 302, so as to be integral to and form the crushable indicator cartridge 300. For example, the first plate 320 is coupled to the seating surface SS where coupling the first plate 320 to the seating surface SS captures the indicator rod 310 between the first plate 320 and the seating surface SS. In one aspect, the first plate 320 includes a first plate aperture 320A and the indicator rod 310 includes a rod head 310H. The indicator rod 310 is inserted through the first plate aperture 320A so as to extend from the first plate 320 where the rod head 310H cooperates with the first plate aperture 320A so that the indicator rod 310 is retained on the first plate 320. In one aspect, the first plate aperture 320A includes a recess 320AR in which the rod head 310H is disposed such that coupling of the first plate 320 to the seating surface SS sandwiches or otherwise captures the rod head 310H between the first plate 320 and the seating surface SS. The indicator rod 310 moves as a unit with a portion of the crushable indicator cartridge 300, such as the seating surface SS and first plate 320, as the crush core 302 is crushed. In other aspects, the indicator rod 310 may be coupled to the first plate 320 in any suitable manner such as through any suitable chemical or mechanical fastener. The first plate 320 may be coupled to the seating surface SS in any suitable manner such as by any suitable chemical or mechanical fasteners. The second plate 325 is coupled to the second end 300E2 in any suitable manner, such as with any suitable chemical or mechanical fasteners and defines an outer surface 300S of the crushable indicator cartridge 300. The second plate 325 includes a second plate aperture 325A and is aligned with the first plate 320, so that the indicator rod 310 extends through both the first plate aperture 320A and the second plate aperture 325A.

In one aspect, referring also to FIGS. 5A and 5B, the second plate 325 includes fasteners 400A, 400B for coupling the second plate 325, and hence the crushable indicator cartridge 300, to the end fitting 350A of the tail skid shock absorber 110. Coupling of the crushable indicator cartridge 300 to the end fitting 350A facilitates the insertion and removal of the crushable indicator cartridge 300 to and from the outer shock absorber canister 200. Coupling the crushable indicator cartridge 300 to the end fitting 350A also facilitates the coupling of the end fitting 350A and the crushable indicator cartridge 300 to the outer shock absorber canister 200 as a single unit. This is particularly useful when removing a crushed crushable indicator cartridge 300. For example, decoupling of the end fitting 350A from the outer shock absorber canister 200 also pulls the crushed crushable indicator cartridge 300 out from inside the outer shock absorber canister 200 making replacement of the crushable indicator cartridge 300 easier and faster to accomplish compared to a crushable indicator cartridge uncoupled from the end fitting and lacking any grasping locations from which the crushable indicator cartridge may be handled for removal from the outer shock absorber canister 200. In one aspect, the end fitting 350A includes at least one end fitting aperture 351A, 351B, through which the indicator rod 310 extends The end fitting 350A also includes fastener apertures 401A, 401B. The fasteners 400A, 400B of the crushable indicator cartridge 300 and the fastener apertures 401A, 401B of the end fitting 350 are aligned with each other such that the at least one end fitting aperture 351A, 351B is aligned with the indicator rod 310 when the end fitting 350A is coupled to the crushable indicator cartridge 300. In one aspect, the end fitting 350A includes two end fitting apertures 351A, 351B that are symmetrically arranged relative to longitudinal axis LAX and the fastener apertures 401A, 401B. The symmetrically arranged end fitting apertures 351A, 351B ensure one of the end fitting apertures 351A, 351B is aligned with the indicator rod 310 upon coupling of the end fitting 350A to the crushable indicator cartridge 300 independent of a rotational orientation of the end fitting 350A about the longitudinal axis LAX (e.g., the fasteners 400A, 400B and the fastener apertures 401A, 401B align one of the end fitting apertures 351A, 351B with the indicator rod 310).

As described above, any suitable anti-rotation device 550 is provided to prevent rotation and disassembly/decoupling of the end fitting 350A and the first tube portion 500A of the outer shock absorber canister 200. For example, the anti-rotation device 550 may be coupled to both the first tube portion 500A (e.g., the elongated tube 500) and the end fitting 350A. For example, the anti-rotation device 550 may be configured to couple with the end fitting 350A through one of the fasteners 400A, 400B and be configured to couple with the first tube portion 500A through an interface with one or more of the lugs 501A-501F. For example, the fasteners 400A, 400B may be arranged on the end fitting 350A, so as to be radially spaced between a respective adjacent pair of the mating lugs 502A-502F. For example, fastener 400A is radially spaced between adjacent mating lugs 502E and 502F while fastener 400B is radially spaced between adjacent mating lugs 502B, 502C. As such, when the end fitting 350A and the first tube portion 500A are coupled the fasteners 400A, 400B are also aligned with recesses 501RR formed by and between adjacent lugs 501A-501F. The anti-rotation member 550 cooperates with both a respective fastener 400A, 400B and a respective recess 501RR to prevent relative rotation between the end fitting 350A and the first tube portion 500A. The anti-rotation device 550 is removably coupled to end fitting 350A, such as with one of the fasteners 400A, 400B, so that the anti-rotation device 550 is removed to allow rotation of the end fitting 350A for removal of the end fitting 350A from the first tube portion 500A.

In one aspect, referring to FIGS. 3A, 3B, 4A and 4B, the tail skid shock absorber 110 includes fluid drainage, so that any fluids located within an interior of the tail skid shock absorber 110 are drained from the interior to an exterior of the tail skid shock absorber 110. For example, the channel 302CH of the crushable indicator cartridge directs fluids, such as by gravity, towards end 300E2, noting that both the first plate 320 and the second plate 325 include respective channel apertures 320CA, 325CA through which the fluid flows. The second plate 325 also includes a fluid drainage groove 450 on the outer surface 300S of the crushable indicator cartridge 300 that bi-directionally extends radially from the channel aperture 325CA. In one aspect, the fluid drainage groove 450 is radially aligned with the second plate aperture 325A through which the indicator rod 310 extends. Alignment of the fluid drainage groove 450 with the second plate aperture 325A directs fluid to the fastener apertures 401A, 401B of the end fitting 350A where the fastener apertures 401A, 401B serve as drainage holes to evacuate the fluid from the interior of the tail skid shock absorber 110.

Referring now to FIGS. 4B, 5A, 5B and 6D, the end fitting 350A includes a recessed area 350RA adjacent each of the end fitting apertures 351A, 351B that is shaped and sized so as to partially surround the indicator rod 310 when the indicator rod 310 extends through one of the end fitting apertures 351A, 351B to provide a visual indication of an amount of remaining energy absorption in the crushable indicator cartridge 300. The recessed area 350RA partially surrounds the indicator rod 310 to shield or otherwise protect the indicator rod 310, as it extends from one of the end fitting apertures 351A, 351B, from debris and contact with objects that may cause bending or other damage to the indicator rod 310. In one aspect, the end fitting apertures 351A, 351B and the recessed area 350RA may be disposed on the end fitting 350A, so that the indicator rod 310 is positioned on a trailing side TS of the tail skid shock absorber 110 relative to forward movement of the aircraft 100 to further protect the indicator rod 310 from contact with debris or other objects.

In one aspect, referring also to FIGS. 3B, 3C, 4B, 5A, 6C, 6D, 7A and 7B, the end fitting 350A includes a datum surface 352 adjacent the end fitting aperture 351A, 351B where the datum surface 352 defines a measuring point from which a distance X1, X2 the indicator rod 310 protrudes from the end fitting aperture 351A, 351B is determined. For example, the distance X1, X2 may be measured so that a magnitude of the tail strike event can be determined using the known crush characteristics of the crush core 302 of the crushable indicator cartridge 300. In other aspects, the indicator rod 310 includes graduations 310GR that indicate an amount of remaining energy absorption of the tail skid shock absorber 110. For example, the surface 310S (see FIGS. 4B and 5A) of the indicator rod 310 may be divided into one or more sections, such as for example, a first section 310S1, a second section 310S2 and a third section 310S3. Here the third section 310S3 is proximate the head 310H, the first section 310S1 is distal from the head 310H and the second section 310S2 is disposed between the first section 310S1 and the third section 310S3. In this aspect, the second section 310S2 comprises a graduated region 310GR which may be knurled, bead blasted, painted, textured or otherwise provide a visual demarcation or graduation from each of the first section 310S1 and the third section 310S3. In one aspect, the visual demarcation or graduation may include a series of graduated lines that indicate the amount of extension of the indicator rod. The first section 310S1, the second section 310S2 and the third section 310S3 of the indicator rod 310 may be color coded to provide for easy visual inspection of the crushable indicator cartridge 300. For example, the first section 310S1 may have a green color indicating no replacement of the crushable indicator cartridge 300 is necessary. The second section 310S2 may have a yellow color indicating that some energy absorption has occurred and that the crushable indicator cartridge 300 is nearing replacement. The third section 310S3 may have a red color indicating replacement of the crushable indicator cartridge 300 is necessary.

The position of the demarcations between the second section 310S2 and each of the first section 310S1 and the third section 310S3 along the indicator rod 310, in one aspect, depends on and is related to the predetermined crush characteristics of the crush core 302 of the crushable indicator cartridge 300 to provide a visual indication of the amount of energy absorption remaining in the tail skid shock absorber 110. For example, as illustrated in FIG. 6B, the indicator rod 310 (see also FIGS. 3C, 6C and 6D) provides a visual indication that there is substantially a full amount of energy absorption available in the crushable indicator cartridge 300 where the distal end 310DE of the indicator rod 310 is substantially even with the datum surface 352 (or the distal end or free end 310DE of the indicator rod 310 is disposed within the end fitting aperture 351A, 351B—see also FIG. 3B). As can be seen in FIGS. 6C and 7A, at least a portion of the first section 310S1 extends from the end fitting aperture 351A, 351B (but the second section 310S2 (see FIGS. 3C and 6D) is not yet extending past the datum surface 352). Extension of at least the portion of the first section 310S1 from the end fitting aperture 351A, 351B provides a visual indication that some crush of the crush core 302 occurred, but that the crushable indicator cartridge 300 remains operational (e.g., the crushable indicator cartridge 300 has sufficient energy absorption remaining to protect against a tail strike event, i.e., the crushable indicator cartridge 300 remains serviceable). For example, full visual exposure of the first section 310S1 from the end fitting aperture 351A, 351B (see also FIG. 3B), with the second section 310S2 (see FIGS. 3C and 6D) not yet extending past the datum surface 352, indicates the crush core 302 has been crushed by an amount X1 in direction 700A relative to the end fitting 350A, so that the crush core 302 has a length D2. It is noted the amount of crush of the crushable indicator cartridge 300 in direction 700A, relative to the end fitting 350A, may be in direct correlation to the amount of movement of the indicator rod 310 due to the first plate 320, the seating surface SS of the crush core 302 and the indicator rod 310 moving as a unit as the crush core 302 is crushed. As can be seen in FIG. 7A, after being crushed an amount X1, the crush core 302 still has the ability to be crushed a distance D-X1.

As can be seen in FIGS. 6D and 7B, further crushing of the crush core 302 from subsequent tail strike events may cause further movement of the indicator rod 310 in direction 700A, relative to the end fitting 350A (or movement of the end fitting 350A in direction 700B relative to the indicator rod 310), so that some or all of the second section 310S2 is visually exposed through the end fitting aperture 351A, 351B. For example, full visual exposure of the second section 310S2 from the end fitting aperture 351A, 351B, with or without the third section 310S3 (see FIG. 3C) extending past the datum surface 352, indicates the crush core has been crushed by an amount X2 in direction 700A relative to the end fitting 350A. It is again noted that the amount of crush of the crush core 302 may be in direct correlation to the amount of movement of the indicator rod 310 due to the first plate 320, the seating surface SS of the crush core 302 and the indicator rod 310 moving as a unit as the crush core 302 is crushed. As can be seen in FIG. 7B, the crush core 302 has been crushed to a length D3, which may result in substantially all of the crush/energy absorption capability of the crushable indicator cartridge 300 being exhausted.

Referring now to FIGS. 2, 3A, 5B, 6A-6D, 7A, 7B and 8 an exemplary operation of the tail skid shock absorber 110 will be provided. In one aspect, the crushable indicator cartridge 300 is inserted into the outer shock absorber canister 200 (FIG. 8, Block 800). For example, as described above the crushable indicator cartridge 300 is coupled to the end fitting 350A using the fasteners 400A, 400B so that the end fitting 350A and the crushable indicator cartridge 300 are coupled to the outer shock absorber canister 200 as a single one piece unit. In one aspect, the crushable indicator cartridge 300 may be crushed to visibly expose the indicator rod 310 through the end fitting aperture 351A, 351B (FIG. 8, Block 810). For example, crushing of the crushable indicator cartridge 300 may occur when the tail skid shoe 270 contacts the runway producing a tail strike force F that pushes the first tube portion 500A of the tail skid shock absorber 110 in direction 700B to cause relative movement between the first tube portion 500A and the second tube portion 500B of the tail skid shock absorber 110, noting that the second tube portion 500B may be held stationary relative to the airframe 110F by the tail skid linkage 290 such that the first tube portion 500A moves relative to the second tube portion 500B. As can be seen in FIGS. 3A, 7A and 7B the crushable indicator cartridge 300 abuts the second tube portion 500B at the first end 300E1 of the crushable indicator cartridge 300, so that the position of the crushable indicator cartridge 300 is also held stationary relative to the airframe 100F and the second tube portion 500B. As such, movement of the first tube portion 500A in direction 700B causes crushing of the crushable indicator cartridge 300 beginning with the first portion Z1 (see FIG. 3A) of the crush core 302 and then with subsequent crushing of the crush core 302 within the second portion Z2 (see FIG. 3A), noting that there may be simultaneous crushing of the crush core 302 within the first portion Z1 and within the second portion Z2 during relative movement between the first tube portion 500A and the second tube portion 500B.

As described above, the relative movement between the first tube portion 500A and the second tube portion 500B causes crushing of the crushable indicator cartridge 300 and visually exposes the indicator rod 310 through the end fitting aperture 351A, 351B. The visual exposure of the indicator rod 310 indicates the amount of energy absorption remaining in the crushable indicator cartridge 300 (FIG. 8, Block 820). For example, a pilot or maintenance personnel performing a pre-flight check may visually observe the exposure of the indicator rod 310 from the ground during the pre-flight check to verify how much of the indicator rod 310 is visually exposed and to determine if the crushable indicator cartridge 300 needs to be replaced. In one aspect, the amount of exposure or extension of the indicator rod 310 relative to, for example the datum surface 352 may provide for the determination of a magnitude of a tail strike event as described above. Where a predetermined amount of the indicator rod 310 is visually exposed (such as all or a portion of the second section 310SS being visually exposed) the crushable indicator cartridge is replaced (FIG. 8, Block 830). As described above, coupling of the crushable indicator cartridge 300 with the end fitting 350A provides for removal/decoupling of the crushable indicator cartridge 300 and the end fitting 350A from the outer shock absorber canister 200 as a unit, making it easy to pull the crushed crushable indicator cartridge 300 from the outer shock absorber canister 200. Once the crushed crushable indicator cartridge 300 is removed, the first tube portion 500A and the second tube portion 500B may be pulled in directions 700A and 700B to return the outer shock absorber canister 200 to an uncompressed length (corresponding to the uncompressed length D1 of the crushable indicator cartridge 300) for insertion of replacement or uncompressed crushable indicator cartridge 300 into the outer shock absorber canister 200.

As can be seen from the above description, the aspects of the present disclosure provide a tail skid shock absorber 110 that includes progressive crush indication by which pilots, maintenance personnel or other individuals can visually, from the ground, determine continued serviceability of the tail skid shock absorber 110 in the event of a tail strike event. As can also be seen from the above-description, the indicator rod 310 is held captive within the crushable indicator cartridge (and is protected from debris) to substantially prevent the indicator rod 310 from being dislodged from the trail skid shock absorber 110.

The following are provided in accordance with the aspects of the present disclosure:

A1. A tail skid shock absorber comprising:

an outer shock absorber canister;

a crushable indicator cartridge disposed within the outer shock absorber canister; and an indicator rod coupled to the crushable indicator cartridge so as to move with a portion of the crushable indicator cartridge as a unit.

A2. The tail skid shock absorber of paragraph A1, wherein the crushable indicator cartridge forms an elongated member that defines a crush core including:

a first plate coupled to the crush core, the indicator rod being coupled to the first plate; and a second plate coupled to the crush core, the second plate defining an outer surface of the crushable indicator cartridge and including a second plate aperture through which the indicator rod extends.

A3. The tail skid shock absorber of paragraph A2, wherein the indicator rod includes a rod head and the first plate includes a first plate aperture, the indicator rod extends through the first plate aperture where the rod head cooperates with the first plate aperture so that the indicator rod is retained on the first plate.

A4. The tail skid shock absorber of paragraph A2, wherein the second plate includes fasteners configured to couple the crushable indicator cartridge to an end fitting of the tail skid shock absorber.

A5. The tail skid shock absorber of paragraph A2, wherein the second plate includes a fluid drainage groove.

A6. The tail skid shock absorber of paragraph A1, wherein the outer shock absorber canister includes an elongated tube and an end fitting, the end fitting being configured to couple with one of a tail skid shoe and an airframe, where the end fitting includes at least one end fitting aperture through which the indicator rod extends.

A7. The tail skid shock absorber of paragraph A6, wherein the end fitting includes a datum surface adjacent the end fitting aperture where the datum surface defines a measuring point from which a distance the indicator rod protrudes from the end fitting aperture is determined.

A8. The tail skid shock absorber of paragraph A6, wherein the indicator rod extends through the end fitting aperture to provide a visual indicator of an amount of remaining energy absorption in the crushable indicator cartridge.

A9. The tail skid shock absorber of paragraph A6, wherein the elongated tube includes a first tube portion and a second tube portion that are moveable relative to each other along a longitudinal axis of the elongated tube.

A10. The tail skid shock absorber of paragraph A6, wherein the end fitting is removably coupled to the elongated tube so that removal of the end fitting from the elongated tube facilitates replacement of the crushable indicator cartridge.

A11. The tail skid shock absorber of paragraph A6, further comprising an anti-rotation member removably coupled to both the elongated tube and the end fitting.

A12. The tail skid shock absorber of paragraph A6, wherein the at least one end fitting aperture includes two end fitting apertures symmetrically arranged on the end fitting.

A13. The tail skid shock absorber of paragraph A1, wherein an outer diameter of crushable indicator cartridge is smaller than an inner diameter of the outer shock absorber canister.

A14. The tail skid shock absorber of paragraph A1, wherein the indicator rod includes at least one graduation that indicates an amount of remaining energy absorption of the tail skid shock absorber.

B1. A crushable indicator cartridge for a tail skid shock absorber, the crushable indicator cartridge comprising:
an indicator rod;
an elongated member defining a crush core;
a first plate coupled to the crush core, the indicator rod being coupled to the first plate; and
a second plate coupled to the crush core, the second plate defining an outer surface of the crushable indicator cartridge and including a second plate aperture through which the indicator rod extends.

B2. The crushable indicator cartridge of paragraph B1, wherein the indicator rod includes a rod head and the first plate includes a first plate aperture, the indicator rod extends through the first plate aperture where the rod head cooperates with the first plate aperture so that the indicator rod is retained on the first plate.

B3. The crushable indicator cartridge of paragraph B1, wherein the indicator rod and the first plate move as a single unit along a longitudinal axis of the elongated member as the crush core is crushed.

B4. The crushable indicator cartridge of paragraph B1, wherein the indicator rod includes graduations that indicate an amount of remaining energy absorption of the tail skid shock absorber.

B5. The crushable indicator cartridge of paragraph B1, wherein the elongated member is configured for insertion to and removal from an outer shock absorber canister of a tail skid shock absorber such that an outer diameter of the elongated member is smaller than an inner diameter of the outer shock absorber canister.

B6. The crushable indicator cartridge of paragraph B1, wherein the second plate includes fasteners configured to couple the crushable indicator cartridge to an end fitting of a tail skid shock absorber.

B7. The crushable indicator cartridge of paragraph B1, wherein the second plate includes a fluid drainage groove.

C1. An aircraft comprising:
an airframe; and
a tail skid shock absorber coupled to the airframe, the tail skid shock absorber including
an outer shock absorber canister;
a crushable indicator cartridge disposed within the outer shock absorber canister; and
an indicator rod coupled to the crushable indicator cartridge so as to move with a portion of the crushable indicator cartridge as a unit.

C2. The aircraft of paragraph C1, wherein the crushable indicator cartridge forms an elongated member that defines a crush core including:
a first plate coupled to the crush core, the indicator rod being coupled to the first plate; and
a second plate coupled to the crush core, the second plate defining an outer surface of the crushable indicator cartridge and including a second plate aperture through which the indicator rod extends.

C3. The aircraft of paragraph C2, wherein the indicator rod includes a rod head and the first plate includes a first plate aperture, the indicator rod extends through the first plate aperture where the rod head cooperates with the first plate aperture so that the indicator rod is retained on the first plate.

C4. The aircraft of paragraph C2, wherein the second plate includes fasteners configured to couple the crushable indicator cartridge to an end fitting of the tail skid shock absorber.

C5. The aircraft of paragraph C2, wherein the second plate includes a fluid drainage groove.

C6. The aircraft of paragraph C1, wherein the outer shock absorber canister includes an elongated tube and an end fitting, the end fitting being configured to couple with one of a tail skid shoe and an airframe, where the end fitting includes an end fitting aperture through which the indicator rod extends.

C7. The aircraft of paragraph C6, wherein the end fitting includes a datum surface adjacent the end fitting aperture where the datum surface defines a measuring point from which a distance the indicator rod protrudes from the end fitting aperture is determined.

C8. The aircraft of paragraph C6, wherein the indicator rod extends through the end fitting aperture to provide a visual indicator of an amount of remaining energy absorption in the crushable indicator cartridge.

C9. The aircraft of paragraph C6, wherein the elongated tube includes a first tube portion and a second tube portion that are moveable relative to each other along a longitudinal axis of the elongated tube.

C10. The aircraft of paragraph C6, wherein the end fitting is removably coupled to the elongated tube so that removal of the end fitting from the elongated tube facilitates replacement of the crushable indicator cartridge.

C11. The aircraft of paragraph C6, further comprising an anti-rotation member removably coupled to both the elongated tube and the end fitting.

C12. The tail skid shock absorber of paragraph A6, wherein the at least one end fitting aperture includes two end fitting apertures symmetrically arranged on the end fitting.

C13. The aircraft of paragraph C1, wherein an outer diameter of crushable indicator cartridge is smaller than an inner diameter of the outer shock absorber canister.

C14. The aircraft of paragraph C1, wherein the indicator rod includes at least one graduation that indicates an amount of remaining energy absorption of the tail skid shock absorber.

D1. A method for indicating an amount of energy absorption remaining in a tail skid shock absorber, the method comprising:
inserting a crushable indicator cartridge into an outer shock absorber canister, where the crushable indicator includes an indicator rod coupled to the crushable indicator cartridge so as to move with a portion of the crushable indicator cartridge as a unit; and
crushing the crushable indicator cartridge through contact of the airplane tail skid with an object so that the indicator rod extends and is exposed from the outer shock absorber canister.

D2. The method of paragraph D1, where an amount of extension of the indicator rod relative to the outer shock absorber canister indicates the amount of energy absorption remaining.

D3. The method of paragraph D1, wherein the amount of extension is determined from a datum surface on an end fitting of the tail skid shock absorber.

D4. The method of paragraph D1, wherein the crushable indicator cartridge includes an elongated member that defines a crush core that includes a first plate coupled to the crush core, the indicator rod being coupled to the first plate, and a second plate coupled to the crush core, the second plate defining an outer surface of the crushable indicator cartridge and including a second plate aperture through which the indicator rod extends, and wherein the first plate and the indicator rod move as a unit during crushing of the crushable indicator cartridge.

D5. The method of paragraph D1, further comprising replacing a crushed crushable indicator cartridge with an uncrushed crushable indicator cartridge when a predetermined amount of energy has been absorbed by the tail skid shock absorber.

D6. The method of paragraph D1, wherein an amount of remaining energy absorption of the tail skid shock absorber is indicated through graduations of the indicator rod.

D7. The method of paragraph D1, wherein an amount of remaining energy absorption of the tail skid shock absorber is visually indicated by an amount of the indicator rod extending from the outer shock absorber canister.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. An aircraft tail skid shock absorber comprising:
   an outer shock absorber canister configured to couple with one of a tail skid shoe or an airframe;
   a crushable indicator cartridge disposed within the outer shock absorber canister; and
   an indicator rod coupled to the crushable indicator cartridge so as to move with a portion of the crushable indicator cartridge as a unit, where the indicator rod extends through an aperture in a wall of the outer shock absorber canister, wherein the indicator rod includes at least one graduation that indicates an amount of remaining energy absorption of the tail skid shock absorber.

2. The aircraft tail skid shock absorber of claim 1, wherein the crushable indicator cartridge forms an elongated member that defines a crush core including:
   a first plate coupled to the crush core, the indicator rod being coupled to the first plate; and
   a second plate coupled to the crush core, the second plate defining an outer surface of the crushable indicator cartridge and including a second plate aperture through which the indicator rod extends, the second plate being separate and distinct from the outer shock absorber canister.

3. The aircraft tail skid shock absorber of claim 2, wherein the indicator rod includes a rod head and the first plate includes a first plate aperture, the indicator rod extends through the first plate aperture where the rod head cooperates with the first plate aperture so that the indicator rod is retained on the first plate.

4. The aircraft tail skid shock absorber of claim 2, wherein the second plate includes fasteners configured to couple the crushable indicator cartridge to an end fitting of the tail skid shock absorber.

5. The aircraft tail skid shock absorber of claim 1, wherein the indicator rod extends through the aperture in the wall of the outer shock absorber canister to provide a visual indicator of an amount of remaining energy absorption in the crushable indicator cartridge.

6. The aircraft tail skid shock absorber of claim 1, wherein the outer shock absorber canister includes a first tube portion and a second tube portion that are moveable relative to each other along a longitudinal axis of the outer shock absorber canister.

7. The aircraft tail skid shock absorber of claim 1, wherein the outer shock absorber canister includes a removable end fitting, where removal of the end fitting from the outer shock absorber canister facilitates replacement of the crushable indicator cartridge.

8. A method for indicating an amount of energy absorption remaining in an aircraft tail skid shock absorber, the method comprising:
   inserting a crushable indicator cartridge into an outer shock absorber canister, where the crushable indicator cartridge includes an indicator rod coupled to the crushable indicator cartridge so as to move with a portion of the crushable indicator cartridge as a unit; and
   crushing the crushable indicator cartridge through contact of the aircraft tail skid with an object so that the indicator rod extends through an aperture in an end of the outer shock absorber canister and is exposed from the outer shock absorber canister, where the end of the outer shock absorber canister couples the tail skid shock absorber to one of a tail skid shoe and an airframe and the indicator rod includes at least one graduation that indicates an amount of remaining energy absorption of the tail skid shock absorber.

9. The method of claim 8, where an amount of extension of the indicator rod relative to the outer shock absorber canister indicates the amount of energy absorption remaining.

10. The method of claim 8, wherein the crushable indicator cartridge includes an elongated member that defines a crush core that includes a first plate coupled to the crush core, the indicator rod being coupled to the first plate, and a second plate coupled to the crush core, the second plate defining an outer surface of the crushable indicator cartridge and including a second plate aperture through which the indicator rod extends, and wherein the first plate and the indicator rod move as a unit during crushing of the crushable indicator cartridge.

11. The method of claim 8, further comprising replacing a crushed crushable indicator cartridge with an uncrushed crushable indicator cartridge when a predetermined amount of energy has been absorbed by the tail skid shock absorber.

12. The method of claim 8, wherein an amount of remaining energy absorption of the aircraft tail skid shock absorber is visually indicated by an amount of the indicator rod extending from the outer shock absorber canister.

13. An aircraft comprising:
an airframe; and
a tail skid shock absorber coupled to the airframe, the tail skid shock absorber including:
an outer shock absorber canister;
a crushable indicator cartridge disposed within the outer shock absorber canister; and
an indicator rod coupled to the crushable indicator cartridge so as to move with a portion of the crushable indicator cartridge as a unit, where the indicator rod extends through an aperture in a wall of the outer shock absorber canister, wherein the indicator rod includes at least one graduation that indicates an amount of remaining energy absorption of the tail skid shock absorber.

14. The aircraft of claim 13, wherein the crushable indicator cartridge forms an elongated member that defines a crush core including:
a first plate coupled to the crush core, the indicator rod being coupled to the first plate; and
a second plate coupled to the crush core, the second plate defining an outer surface of the crushable indicator cartridge and including a second plate aperture through which the indicator rod extends.

15. The aircraft of claim 14, wherein the indicator rod includes a rod head and the first plate includes a first plate aperture, the indicator rod extends through the first plate aperture where the rod head cooperates with the first plate aperture so that the indicator rod is retained on the first plate.

16. The aircraft of claim 14, wherein the second plate includes fasteners configured to couple the crushable indicator cartridge to an end fitting of the tail skid shock absorber.

17. The aircraft of claim 14, wherein the second plate includes a fluid drainage groove.

18. The aircraft of claim 13, wherein the outer shock absorber canister includes an elongated tube and an end fitting, the end fitting being configured to couple with one of a tail skid shoe and an airframe, where the end fitting includes an end fitting aperture through which the indicator rod extends.

19. The aircraft of claim 18, wherein the end fitting includes a datum surface adjacent the end fitting aperture where the datum surface defines a measuring point from which a distance the indicator rod protrudes from the end fitting aperture is determined.

20. The aircraft of claim 18, further comprising an anti-rotation member removably coupled to both the elongated tube and the end fitting.

* * * * *